US012129696B2

(12) United States Patent
Daniels

(10) Patent No.: US 12,129,696 B2
(45) Date of Patent: Oct. 29, 2024

(54) DOOR LOCK DEVICE

(71) Applicant: Osceola Cuts, LLC, Ocilla, GA (US)

(72) Inventor: William Bruce Daniels, Ocilla, GA (US)

(73) Assignee: Osceola Cuts, LLC, Ocilla, GA (US)

( * ) Notice: Subject to any disclaimer, the term of this patent is extended or adjusted under 35 U.S.C. 154(b) by 233 days.

(21) Appl. No.: 17/683,568

(22) Filed: Mar. 1, 2022

(65) Prior Publication Data

US 2022/0282536 A1 Sep. 8, 2022

Related U.S. Application Data

(60) Provisional application No. 63/157,266, filed on Mar. 5, 2021.

(51) Int. Cl.
*E05C 19/00* (2006.01)

(52) U.S. Cl.
CPC .................................. *E05C 19/005* (2013.01)

(58) Field of Classification Search
CPC .. E05B 2063/0039; E05B 15/10; E05C 17/46; E05C 19/003; E05C 19/18; E05C 19/184; E05C 19/188; E05C 19/005; Y10S 292/15
USPC ........................ 292/259 R, 338, 339; 70/135
See application file for complete search history.

(56) References Cited

U.S. PATENT DOCUMENTS

| | | | | | |
|---|---|---|---|---|---|
| 4,198,088 | A * | 4/1980 | Tochihara | E05C 19/18 | 292/288 |
| 5,152,563 | A * | 10/1992 | Fontenot | E05B 67/36 | 292/264 |
| 5,547,236 | A * | 8/1996 | Gregory | E05C 19/182 | 292/288 |
| 5,590,928 | A * | 1/1997 | Voiculescu | E05C 17/446 | 292/338 |
| 8,376,422 | B2 * | 2/2013 | Swink | E05B 15/021 | 292/288 |
| 9,988,833 | B2 * | 6/2018 | Powell | E05F 5/02 | |
| 11,299,911 | B2 * | 4/2022 | Geenens | E05B 53/001 | |
| 11,447,991 | B2 * | 9/2022 | Taylor | E05B 63/0004 | |
| 2014/0217754 | A1 * | 8/2014 | Taylor | E05C 19/003 | 292/288 |
| 2017/0145721 | A1 * | 5/2017 | Taylor | E05C 19/009 | |
| 2018/0333600 | A1 * | 11/2018 | Pristach | E05C 19/003 | |
| 2022/0205294 | A1 * | 6/2022 | Taylor | E05C 19/004 | |
| 2022/0282562 | A1 | 9/2022 | Daniels | | |

FOREIGN PATENT DOCUMENTS

| | | | | |
|---|---|---|---|---|
| GB | 2483919 A | * | 3/2012 | E05C 19/18 |

* cited by examiner

*Primary Examiner* — Kristina R Fulton
*Assistant Examiner* — James Edward Ignaczewski
(74) *Attorney, Agent, or Firm* — Buchalter

(57) ABSTRACT

A door lock device includes a door mount comprising a front base plate and a mounting guide coupled to the front base plate, the door mount mountable to a door; and a lock arm assembly comprising an attachment plate and a structure engagement assembly, the attachment plate defining a mounting slot, the mounting guide engaging the mounting slot to mount the lock arm assembly on the door mount, the structure engagement assembly configured to engage a structure surrounding the door to prevent the door from opening.

22 Claims, 13 Drawing Sheets

DOOR LOCK DEVICE

CROSS-REFERENCE TO RELATED APPLICATIONS

The present application claims the benefit of U.S. Provisional Application No. 63/157,266, filed Mar. 5, 2021, which is hereby specifically incorporated by reference herein in its entirety.

TECHNICAL FIELD

This disclosure relates to doors. More specifically, this disclosure relates to lock assembly for doors.

BACKGROUND

Locks for doors are sometimes employed to prevent unauthorized access through the door. Conventional locks often comprise piece of metal that slides out from the door and engages a surrounding door frame. However, if enough force is applied to the lock, the lock can fail or break, allowing the door to be opened, which can present a danger in situations where the door must be secured, such as a lockdown situation involving an unwelcome intruder.

SUMMARY

It is to be understood that this summary is not an extensive overview of the disclosure. This summary is exemplary and not restrictive, and it is intended neither to identify key or critical elements of the disclosure nor delineate the scope thereof. The sole purpose of this summary is to explain and exemplify certain concepts of the disclosure as an introduction to the following complete and extensive detailed description.

Disclosed is a door lock device comprising a door mount comprising a front base plate and a mounting guide coupled to the front base plate, the door mount mountable to a door; and a lock arm assembly comprising an attachment plate and a structure engagement assembly, the attachment plate defining a mounting slot, the mounting guide engaging the mounting slot to mount the lock arm assembly on the door mount, the structure engagement assembly configured to engage a structure surrounding the door to prevent the door from opening.

Also disclosed is a method of locking a door with a door lock device, the method comprising attaching a door mount to a door, the door mount comprising a mounting guide; mounting a lock arm assembly to the door mount, comprising sliding a guide ledge of the door mount into a mounting slot of the lock arm assembly; and engaging a structure engagement assembly of the lock arm assembly with a structure surrounding the door to prevent the door from opening.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

Figure 1:
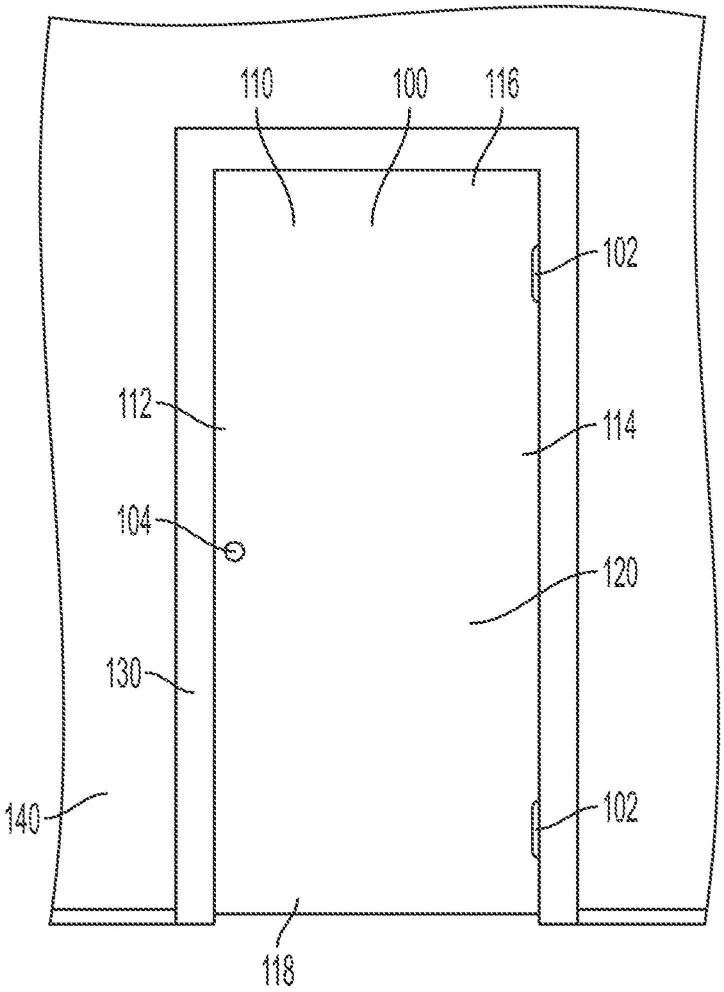
FIG. 1 is a front view of a door.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutations of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed is a door lock device and associated methods, systems, devices, and various apparatus. Example aspects of the door lock device can comprise a door mount and a lock arm assembly mountable on the door mount. It would be understood by one of skill in the art that the door lock device is described in but a few exemplary embodiments among many. No particular terminology or description should be considered limiting on the disclosure or the scope of any claims issuing therefrom.

FIG. 1 is a front perspective view of a prior art door 100. The door 100 can comprise a door panel 110 defining a first door side 112, a second door side 114 opposite the first door side 112, a top door end 116, and a bottom door end 118 opposite the top door end 116. The door panel 110 can further define a door panel front face 120 and door panel rear face (not shown) opposite the door panel front face 120. In example aspects, one or more hinges 102 can be coupled to the door panel 110 at the second door side 114 thereof. The hinges 102 can be configured to pivotably mount the door 100 to a door frame 130, which can be defined by or coupled to a wall 140 or other surrounding structure. In some aspects, a door knob 104 or door handle 1304 (shown in FIG. 13) can be coupled to the door panel 110 proximate to the first door side 112, which can be gripped by a user to pivot the door 100 relative to the door frame 130. In the present aspect, the door 100 can be opened towards the second door side 114 and away from the first door side 112 (i.e., in a direction going into the page).

Figure 2:
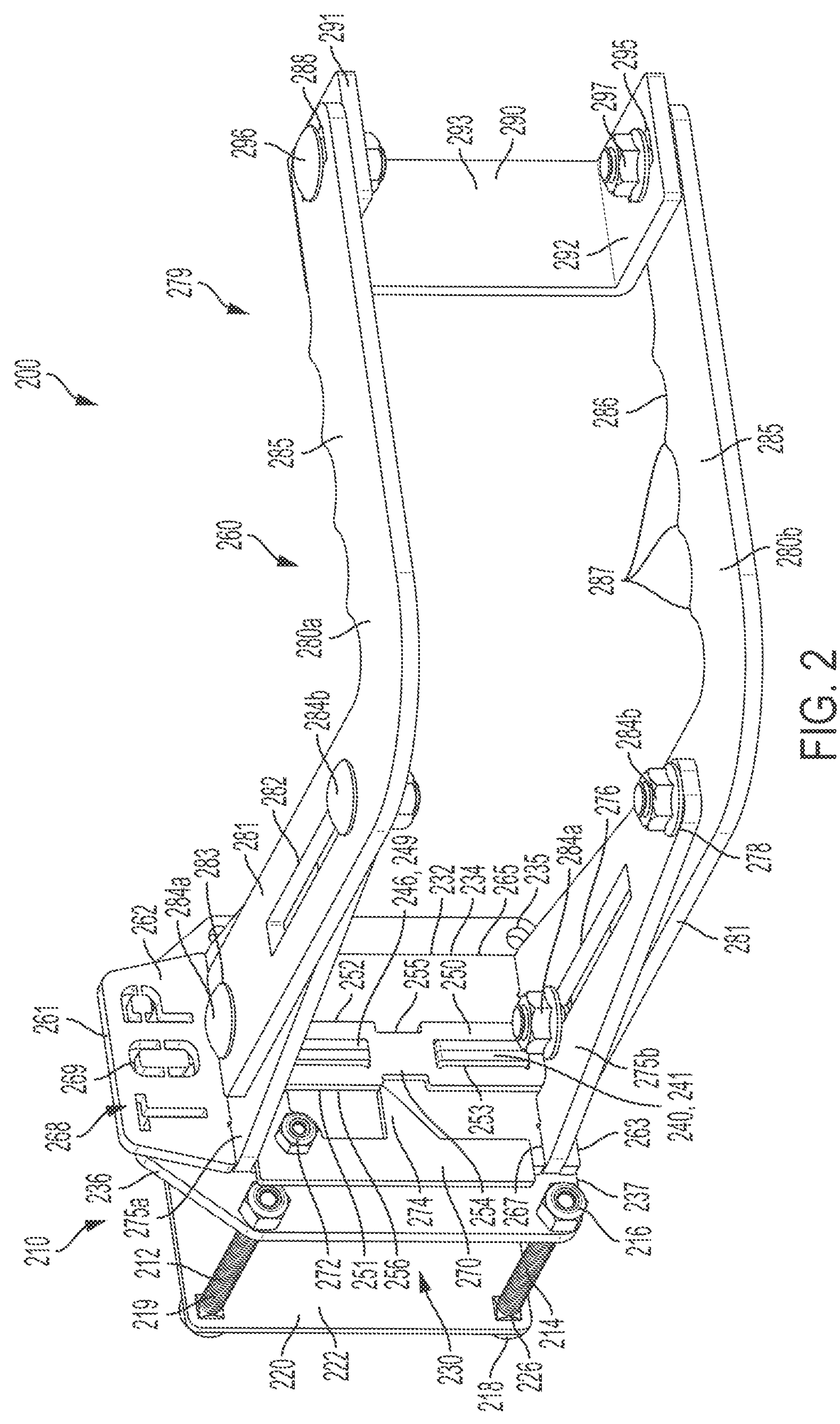
FIG. 2 is a front perspective view of a door lock device comprising a door mount and a lock arm assembly, in accordance with one aspect of the present disclosure.
Figure 3:
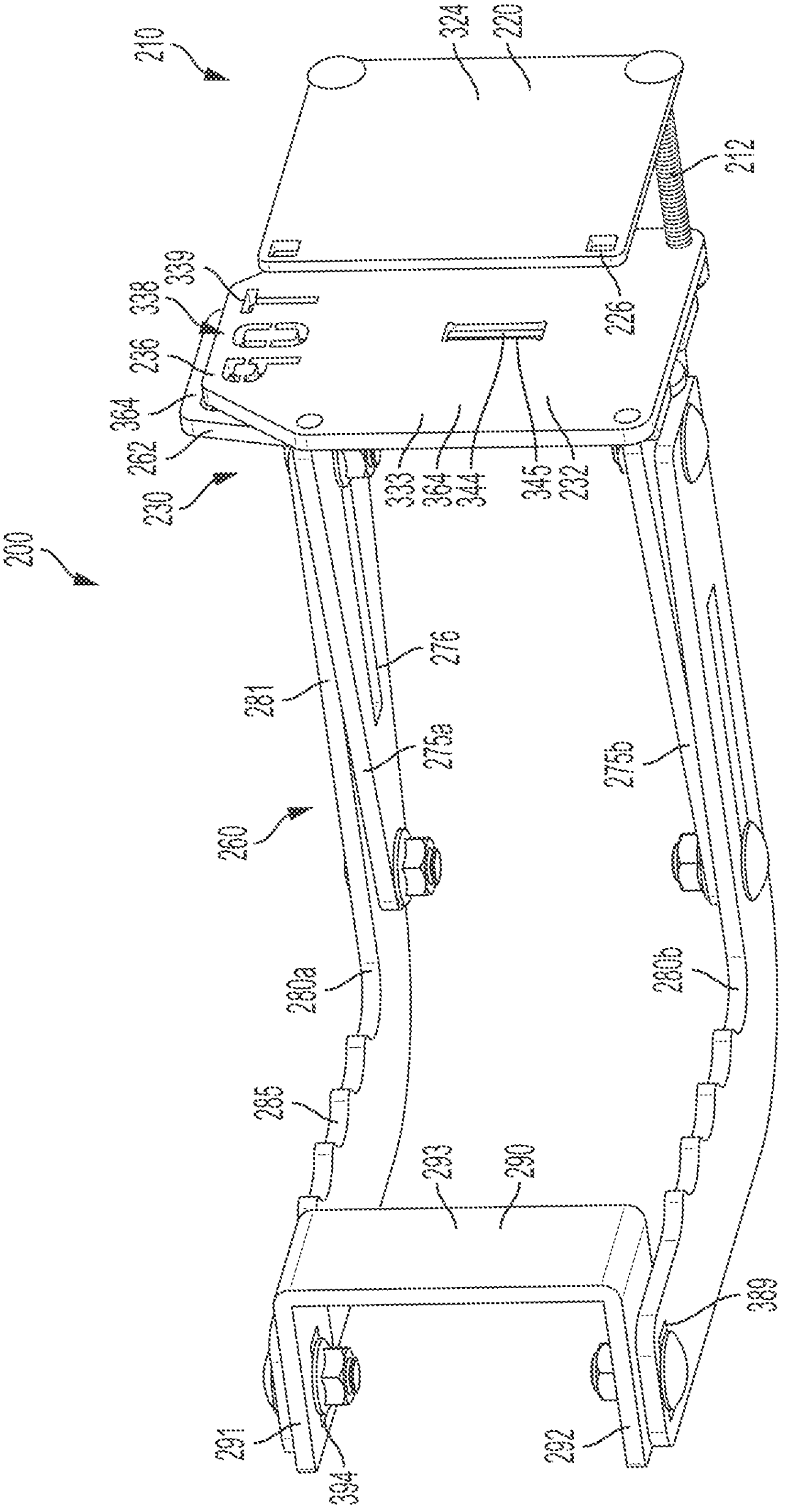
FIG. 3 is a rear perspective view of the door lock device of FIG. 2.

FIGS. 2 and 3 are front and rear perspective view of a door lock device 200, respectively, in accordance with one aspect of the present disclosure. Example aspects of the door lock device 200 can comprise a door mount 210 and a lock arm assembly 260. The door mount 210 can be secured to the door panel 110 of a door, such as the door 100 shown in FIG. 1. The lock arm assembly 260 can be selectively mounted to the door mount 210 to lock and unlock the door 100 as needed. For example, the door lock 200 can be utilized in lockdown situations in buildings such as offices, schools, and government facilities, wherein a person inside of a room wishes to reinforce the door 100 from the inside. According to example aspects, the door mount 210 can comprise a rear base plate 220 and a front mounting assembly 230. The door mount 210 can further comprise one or more mounting fasteners 212 for coupling the door mount 210 to the door 100. In example aspects, the rear base plate 220 can be positioned at the door panel rear face of the door 100, and the front mounting assembly 230 can be positioned at the door panel front face 120 (shown in FIG. 1) of the door 100. Thus, the front base plate 220 can be positioned on the side of the door 100 opposite from the direction in which the door 100 opens. Each of the mounting fasteners 212 can extend through the door panel 110 from the door panel front face 120 to the door panel rear face, and can engage the rear base plate 220 and the front mounting assembly 230 to couple the door mount 210 to the door 100. For example, each of the mounting fasteners 212 can be configured to extend through a corresponding bore formed through the door panel 110. In the present aspect, each of the mounting fasteners 212 can comprise a threaded bolt 214 and a front nut 216. The threaded bolt 214 can define a bolt head 218 and a bolt tail 219 extending from the bolt head 218. In other aspects, the mounting fasteners 212 can be any suitable fastener known in the art, including but not limited to, screws, rivets, and the like. Furthermore, other aspects of the door mount 210 may not comprise the rear base plate 220 and can comprise the front mounting assembly 230 only.

According to example aspects, the front mounting assembly 230 can comprise a front base plate 232. The front base plate 232 can define a front inner surface 333 (shown in FIG. 3) that can be configured to confront the door panel front face 120 of the door panel 110 when mounted to the door 100. The front base plate 232 can further define a front outer surface 234 opposite the front inner surface 333. Each of the front inner surface 333 and front outer surface 234 can be substantially planar in the present aspect. Furthermore, one or more front mounting holes 235 can be formed through the front base plate 232 and can extend from the front inner surface 333 to the front outer surface 234. Each of the threaded bolts 214 can extend through a corresponding one of the front mounting holes 235. Example aspects of the rear base plate 220 can define a rear inner surface 222 that can be configured to confront the door panel rear face of the door panel 110 when mounted to the door 100. The rear base plate 220 can further define a rear outer surface 324 (shown in FIG. 3) opposite the rear inner surface 222. Each of the rear inner surface 222 and rear outer surface 324 can be substantially planar in the present aspect. As shown, one or more rear mounting holes 226 can be formed through the rear base plate 220 and can extend from the rear inner surface 222 to the rear outer surface 324. Each of the threaded bolts 214 can further extend through a corresponding one of the rear mounting holes 226. In some aspects, each of the rear mounting holes 226 can be substantially square-shaped, and can engage a square or hexagon portion of the bolt tail 219.

To secure the door mount 210 to the door 100, the bolt tail 219 of each of the mounting fasteners 212 can extend through a corresponding one of the rear mounting holes 226 and a corresponding one of the front mounting holes 235, and the bolt head 218 of the mounting fastener 212 can abut the rear outer surface 324 of the rear base plate 220. The front nut 216 of each mounting fastener 212 can be tightened by rotating the front nut 216 on the corresponding threaded bolt 214 to abut the front outer surface 234 of the front base plate 232. The corresponding square-shaped rear mounting hole 226 can engage the square or hexagon portion of the corresponding bolt tail 219 to prevent the threaded bolt 214 from rotating as the front nut 216 is tightened. In some aspects, the bolt heads 218 can be domed, as shown in FIG. 3, such that the mounting fasteners 212 can be difficult to remove from the second door side 114 of the door 100.

Example aspects of the front base plate 232 can further define a base upper end 236 and a base lower end 237 opposite the base upper end 236. In some aspects, the front base plate 232 can define base orientation indicia 338 (shown in FIG. 3) that can facilitate mounting the front base plate 232 to the door panel 110 in the proper orientation. In the present aspect, as shown, the word "TOP" 339 (shown in FIG. 3) can be defined at or near the base upper end 236 of the front base plate 232 to indicate the base upper end 236. For example, the word "TOP" 339 can be stamped through or etched into the front base plate 232. In other aspects, the base orientation indicia 338 can define any other suitable words, images, or the like for indicating the proper orientation of the front base plate 232. Other aspects of the front base plate 232 may not comprise the base orientation indicia 338.

Example aspects of the front mounting assembly 230 can further comprise a mounting guide 240 and a guide cap 250. In the present aspect, the mounting guide 240 can comprise two adjacent guide components 241. However, in other aspects, the mounting guide 240 can be formed as a singular component. According to example aspects, the mounting guide 240 can define a guide body 742 (shown in FIG. 7A), one or more engagement tabs 344 (shown in FIG. 3), and a guide ledge 246. The guide body 742 can be configured to confront, and in some instances can abut, the front outer surface 234 of the front base plate 232. In example aspects, the guide body 742 can be oriented substantially parallel to the front base plate 232. The engagement tab(s) 344 can extend inward from the guide body 742 about perpendicular to the guide body 742, and can configured to engage an engagement opening 345 (shown in FIG. 3) of the front base plate 232 to couple the mounting guide 240 thereto. The guide ledge 246 can extend outward from the guide body 742 about perpendicular thereto, opposite the engagement tab 344 and away from the front base plate 232, as shown. In the present aspect, the guide ledge 246 can comprise a pair of guide tabs 249. According to example aspects, the guide cap 250 can be mounted to the guide ledge 246 distal to the guide body 742. For example, each of the guide tabs 249 can be configured to engage a corresponding cap opening 253 of the guide cap 250 to mount the guide cap 250 to the guide tabs 249. In the present aspects, the guide cap 250 can be substantially planar, and can be oriented about parallel to the guide body 742 and the front base plate 232, and about perpendicular to the guide ledge 246. Thus, the guide ledge 246 (i.e., the guide tabs 249) can extend between the guide body 742 and the guide cap 250. A guide channel 710 (shown in FIG. 7A) can be defined between the guide body 742 and the guide cap 250 and can substantially encircle the guide ledge 246. As shown, example aspects of the guide cap 250 can define a first cap recess 254 at a first side 251 of the guide cap 250 and a second cap recess 255 at a second side 252 of the guide cap 250.

According to example aspects, the lock arm assembly 260 can comprise an attachment plate 262 configured to selectively mount the lock arm assembly 260 on the door mount 210. The attachment plate 262 can define a plate upper end 261 and a plate lower end 263 opposite the plate upper end 261. Example aspects of the attachment plate 262 can further define an attachment inner surface 364 (shown in FIG. 3) and an attachment outer surface 265 opposite the attachment inner surface 364. The attachment inner surface 364 can be configured to confront the guide body 742 of the mounting guide 240 when mounted on the door mount 210. The attachment outer surface 265 can be configured to confront the guide cap 250 when mounted on the door mount 210. Each of the attachment inner surface 364 and attachment outer surface 265 can be substantially planar in the present aspect. In the present aspect, the attachment plate 262 can define a mounting slot 865 (shown in FIG. 8) extending from the plate lower end 263 towards the plate upper end 261. To mount the attachment plate 262 to the door mount 210, the mounting slot 865 can be aligned vertically above the guide ledge 246 of the mounting guide 240, relative to the orientation shown. The attachment plate 262 can then be lowered onto the guide mount with the guide ledge 246 engaging and sliding vertically within the mounting slot 865. According to example aspects, an upper ledge end of the guide ledge 246 can engage an upper slot end 866 (shown in FIG. 8) of the mounting slot 865 to support the lock arm assembly 260 on the door mount 210. Furthermore, portions of the attachment plate 262 surrounding the mounting slot 865 can be received within the guide channel 710 define between the guide body 742 and the guide cap 250.

In some aspects, the attachment plate 262 can define plate orientation indicia 268 that can facilitate mounting the lock arm assembly 260 on the door mount 210 in the proper orientation. In the present aspect, as shown, the word "TOP"

269 can be defined at or near the plate upper end 261 of the attachment plate 262 to indicate the plate upper end 261. For example, the word "TOP" 269 can be stamped through or etched into the attachment plate 262. In other aspects, the plate orientation indicia 268 can define any other suitable words, images, or the like for indicating the proper orientation of the attachment plate 262. Other aspects of the attachment plate 262 may not comprise the base orientation indicia 268. Furthermore, in some aspects, a lock element 270 can be coupled to the attachment outer surface 265 of the attachment plate 262 by a lock fastener 272, as shown. In example aspects, the lock fastener 272 can be a nut and bolt fastener, as shown, or can be any other suitable fastener known in the art, such as a screw, rivet, or the like. The lock fastener 272 can be configured to extend through a lock opening 1010 (shown in FIG. 10A) of the lock element 270 and an attachment opening 860 (shown in FIG. 8) of the attachment plate 262 to secure the lock element 270 to the attachment plate 262. The lock element 270 can define a lock projection 274 configured to engage and ride along an outer cap edge 256 of the guide cap 250 at the first side 251 thereof as the mounting slot 865 is lowered onto the guide ledge 246 to mount the lock arm assembly 260 on the door mount 210. Once the lock arm assembly 260 has been mounted on the door mount 210, the lock projection 274 can catch on the first cap recess 254 of the guide cap 250 to prohibit removal of the lock arm assembly 260 from the door mount 210 unless a suitable force is applied. In other aspects, the lock element 270 can be biased towards the guide cap 250 and can be pushed away from the guide cap 250 by the outer cap edge 246 as the lock arm assembly 260 is being mounted on the door mount 210. The lock element 270 can be biased towards the guide cap 250 by a spring, for example, or any other suitable biasing mechanism. Once mounted, the lock projection 274 can be biased by the spring into engagement with the first cap recess 254. In other aspects, the lock element 270 can define any other suitable configuration. In other aspects, the lock arm assembly 260 does not comprise the lock element 270.

Figure 14:
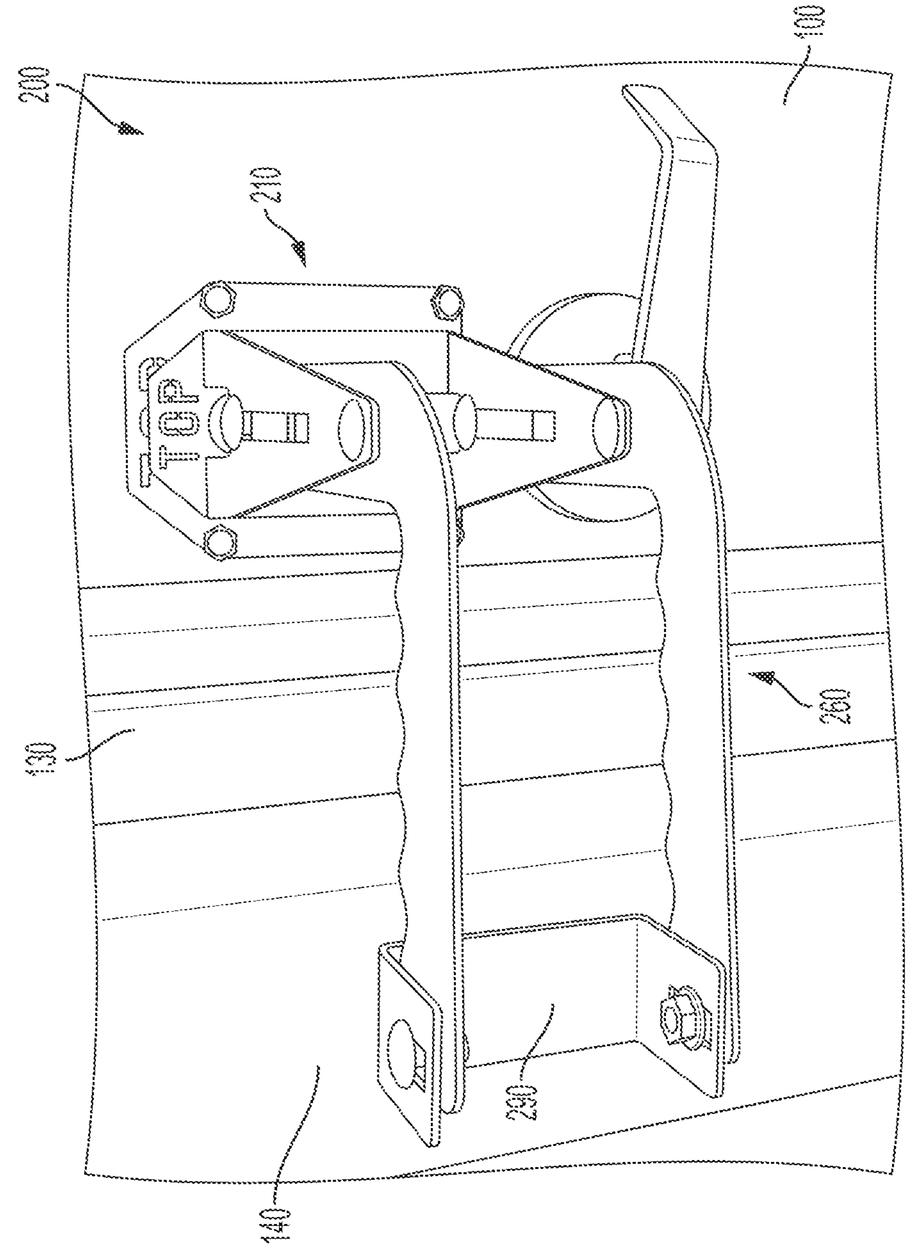
FIG. 14 is a front perspective view of the door lock device of FIG. 1 mounted to the door of FIG. 11.

Example aspects of the lock arm assembly 260 can further comprise a structure engagement assembly 279. The structure engagement assembly 279 can comprise first and second arm members 280*a,b* and an engagement pad 290. The structure engagement assembly 279 can be configured to engage a structure surrounding the door 100 (shown in FIG. 1), such as the door frame 130 and/or the wall 140 (both shown in FIG. 1), to prohibit the door 100 from being opened. The lock arm assembly 260 can also comprise first and second support members 275*a,b*, and the first and second arm members 280*a,b* can be coupled to the attachment plate 262 by the first and second support members 275*a,b*. However, in other aspects, the first and second arm members 280*a,b* can be directly coupled to the attachment plate 262. As shown, each of the first and second support members 275*a,b* can be coupled to and can extend from the attachment plate 262. The first support member 275*a* can be coupled to the attachment plate 262 proximate to the plate upper end 261, and the second support member 275*b* can be coupled to the attachment plate 262 proximate to the plate lower end 263. The first and second support members 275*a,b* can be oriented about perpendicular to the attachment plate 262 and can extend away from the door mount 210, as shown. When mounted to the door 100, the first and second support members 275*a,b* can be oriented about perpendicular to the door panel 110, as shown in FIG. 14. In the present aspect, each of the first and second support members 275*a,b* can define a support adjustment slot 276 and a support fastener hole 278 formed therethrough. Moreover, according to example aspects, each of the first and second support members 275*a,b* can define a pair of support tabs 979 (shown in FIG. 9) configured to engage a corresponding pair of attachment slots 267 formed in the attachment plate 262 to couple the first and second support members 275*a,b* to the attachment plate 262.

Each of the first and second arm members 280*a,b* can be substantially L-shaped in the present aspect, and can define a first arm section 281 adjustably mounted to a corresponding one of the first and second support members 275*a,b* and a second arm section 285 extending from the corresponding first arm section 281 distal to the door mount 210. Each of the first arm sections 281 can overlap and can be oriented substantially parallel to a corresponding one of the first and second support members 275*a,b*. Furthermore, the first arm sections 281 can be oriented about perpendicular to the attachment plate 262 and can extend away from the door mount 210, as shown. When mounted to the door 100, the first arm sections 281 can be oriented about perpendicular to the door panel 110, as shown in FIG. 14. Each of the first arm sections 281 can define an arm adjustment slot 282 and arm fastener hole 283 formed therethrough. Each of the support adjustment slots 276 can be aligned with a corresponding one of the arm fastener holes 283, and each of the arm adjustment slots 282 can be aligned with a corresponding one of the support fastener holes 278. According to example aspects, a first adjustment fastener 284*a* can pass through each corresponding support adjustment slot 276 and arm fastener hole 283, and a second adjustment fastener 284*b* can pass through each corresponding arm adjustment slot 282 and support fastener hole 278. In example aspects, the first and second adjustment fasteners 284*a,b* can be nut and bolt fasteners, as shown, or can be any other suitable fasteners known in the art, such as screws, rivets, and the like. Each of the first adjustment fasteners 284*a* can be configured to slide within the corresponding support adjustment slot 276 to reposition the corresponding first or second arm member 280*a,b* at a desired position relative to the corresponding first or second support member 275*a,b*, respectively. As each first adjustment fastener 284*a* slides within the corresponding support adjustment slot 276, each of the second adjustment fasteners 284*b* can slide within the corresponding arm adjustment slot 282. The first adjustment fasteners 284*a* and second adjustment fasteners 284*b* can be selectively tightened to secure the corresponding first or second arm member 280*a,b* to the corresponding first or second support member 275*a,b* at the desired position.

According to example aspects, the second arm section 285 of each arm member can be substantially coplanar with the corresponding first arm section 281 and can be oriented substantially perpendicular to the first arm section 281. In some aspects, when mounted to the door 100, the second arm sections 285 can be oriented about parallel to the door panel 110. In other aspects, the second arm section 285 can be oriented at an obtuse or acute angle relative to the first arm section 281. In the present aspect, a plurality of teeth 287 can be formed along an inner arm surface 286 of each of the second arm sections 285. The teeth can be configured to face, and in some aspects, engage, the door frame 130 when the lock arm assembly 260 is mounted on the door mount 210.

In example aspects, the engagement pad 290 can extend between the second arm sections 285 of the first and second arm members 280*a,b*, distal to the first arm sections 281. Example aspects of the engagement pad 290 can be substantially U-shaped and can define a first side plate 291, a second side plate 292 opposite the first side plate 291, and an engagement portion 293 extending between the first and second side plates 291,292. As shown the first side plate 291 can define a first pad slot 394 (shown in FIG. 3) and the second side plate 292 can define a second pad slot 295. The first pad slot 394 can be configured to align with a first arm slot 288 formed through the second arm section 285 of the first arm member 280*a*, and the second pad slot 295 can be configured to align with a second arm slot 389 (shown in FIG. 3) formed through the second arm section 285 of the second arm member 280*b*. A first pad fastener 296 can extend through and slide within each of the first arm slot 288 and first pad slot 394, and a second pad fastener 297 can extend through and slide within each of the second arm slot 389 and second pad slot 295 to reposition the engagement pad 290 at a desired position relative to the first and second arm members 280*a,b*. The first and second pad fasteners 296,297 can then be selectively tightened to secure the engagement pad 290 to the first and second arm members 280*a,b* at the desired position. In example aspects, the first and second pad fasteners 296,297 can be nut and bolt fasteners, as shown, or can be any other suitable fasteners known in the art, such as screws, rivets, and the like. When the door lock device 200 is mounted to the door 100, the engagement portion 293 of the engagement pad 290 can extend towards and engage the door frame 130, the wall 140, or any other structure surrounding the door 100 to prohibit the door 100 from being opened.

Figure 4:
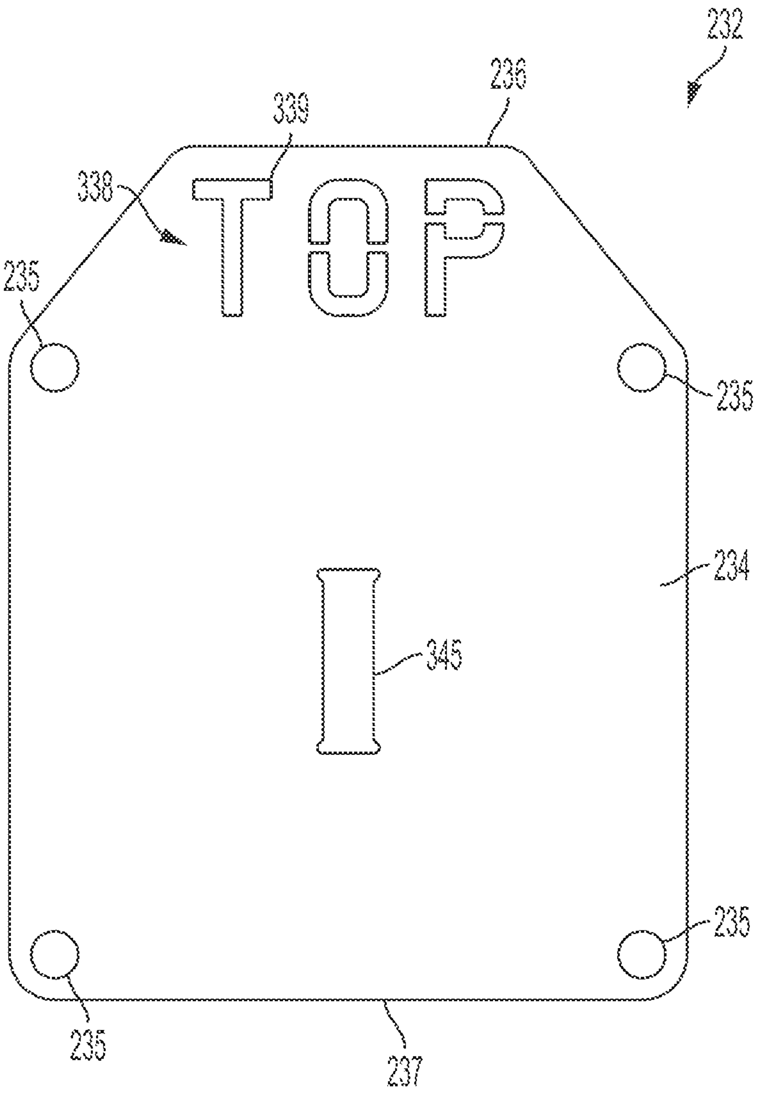
FIG. 4 is a front view of the front base plate of the door mount of FIG. 2.

FIG. 4 is a front view of the front base plate 232.

Figure 5:
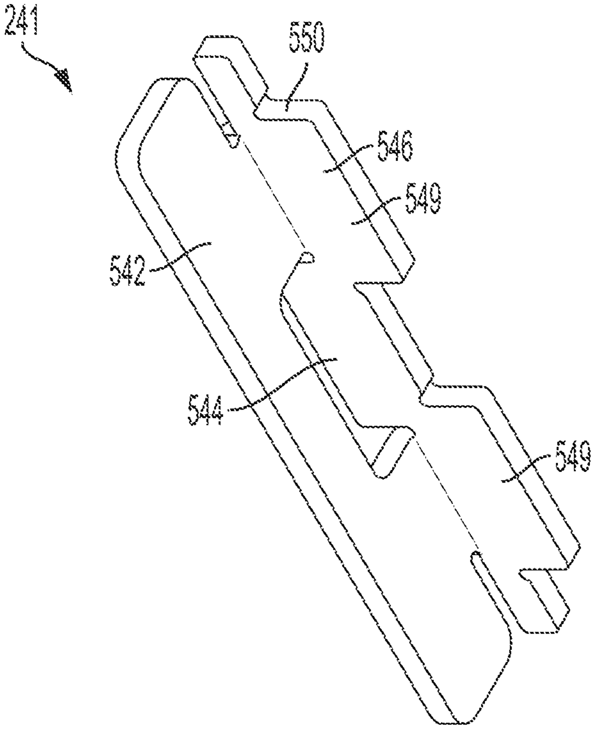
FIG. 5 is a front perspective view of a guide component of the door mount of FIG. 2.

FIG. 5 is a front perspective view of one of the guide components 241 of the mounting guide 240, which can be substantially identical to the other guide component 241 of the mounting guide 240. According to example aspects, the two guide components 241 can be oriented adjacent to one another to define the mounting guide 240 (shown in FIG. 2). As shown, each of the guide components 241 can define a guide body portion 542, and the guide body portions 542 can together define the guide body 742 (shown in FIG. 7A). Each of the guide components 241 can also define an engagement tab portion 544, and the engagement tab portions 544 can together define the engagement tab 344 (shown in FIG. 3). Furthermore, each of the guide components 241 can define a guide ledge portion 546, and the guide ledge portions 546 can together define the guide ledge 246 (shown in FIG. 2). In the present aspect, each of the guide ledge portions 546 can be defined by a pair of guide tab portions 549, and the guide tab portions 549 of the guide components 241 can together define the guide tabs 249 (shown in FIG. 2). Additionally, each of the guide components 241 can define an upper ledge end portion 550 of the corresponding guide ledge portion 546, and the upper ledge end portions 550 can together define the upper ledge end of the guide ledge 246.

Figure 6:
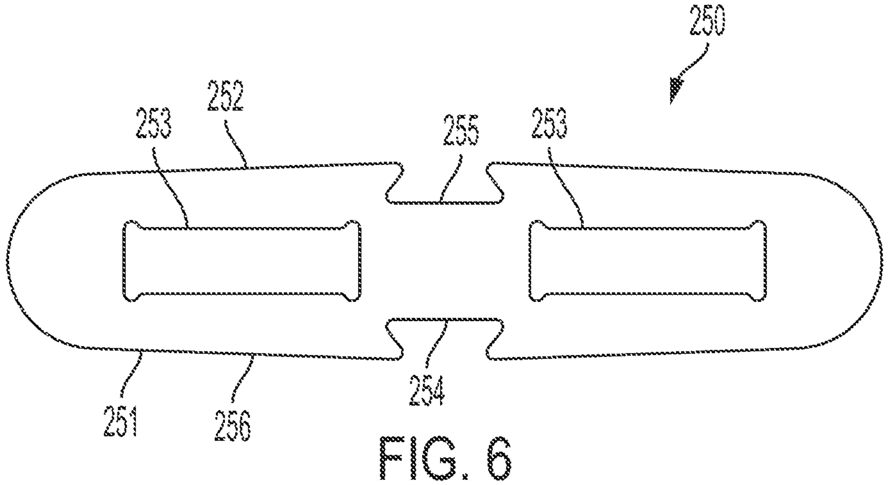
FIG. 6 is a front view of a guide cap of the door mount of FIG. 2.

FIG. 6 is a front view of the guide cap 250.

Figure 7A:
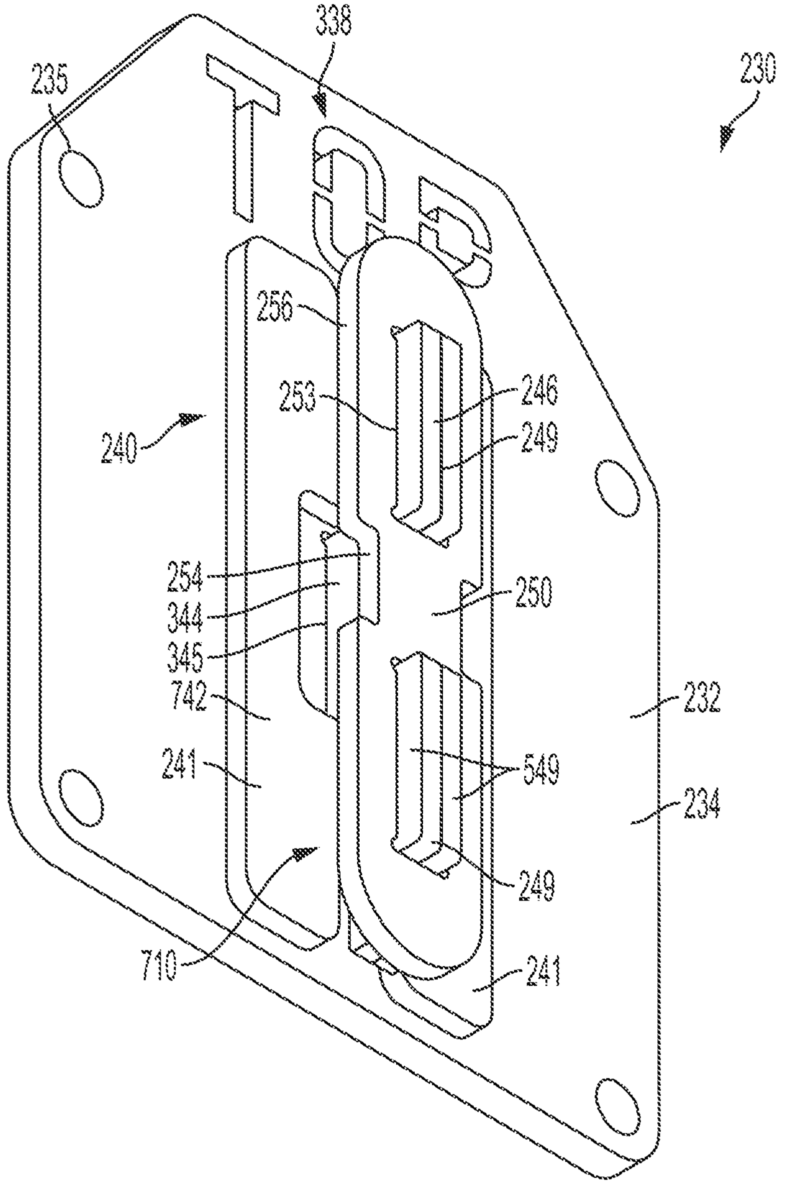
FIG. 7A is a front perspective view of a front mounting assembly of the door mount of FIG. 2, the front mounting assembly comprising the front base plate of FIG. 4, a pair of the guide components of FIG. 5, and the guide cap of FIG. 6.

FIG. 7A is a front perspective view of the front mounting assembly 230.

Figure 7B:
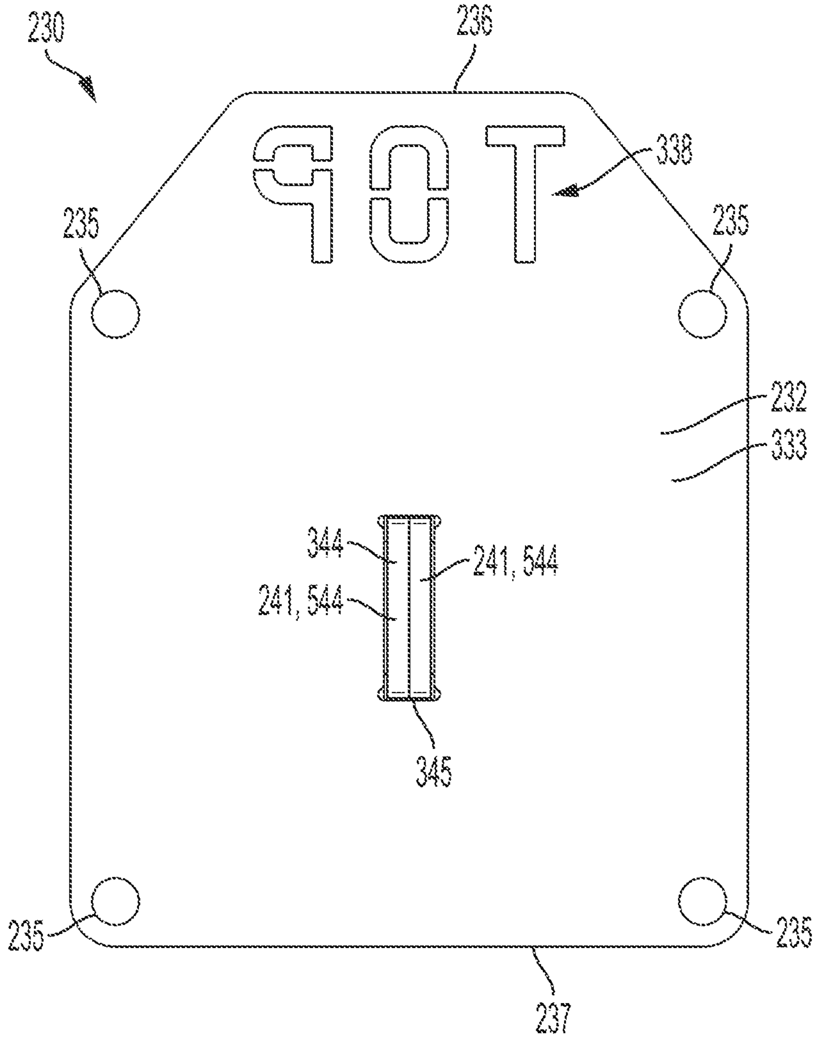
FIG. 7B is a rear view of the front mounting assembly of FIG. 7A.

FIG. 7B is a rear view of the front mounting assembly 230. As shown, the front mounting assembly 230 can comprise the front base plate 232. The front base plate 232 can define the front inner surface 333 opposite the front outer surface 234 (shown in FIG. 7A). The engagement opening 345 can extend through the front base plate 232 from the front outer surface 234 to the front inner surface 333. The engagement tab portions 544 of the guide components 241 can together define the engagement tab 344, and the engagement tab 344 can extend through the engagement opening 345 of the front base plate 232.

Figure 8:
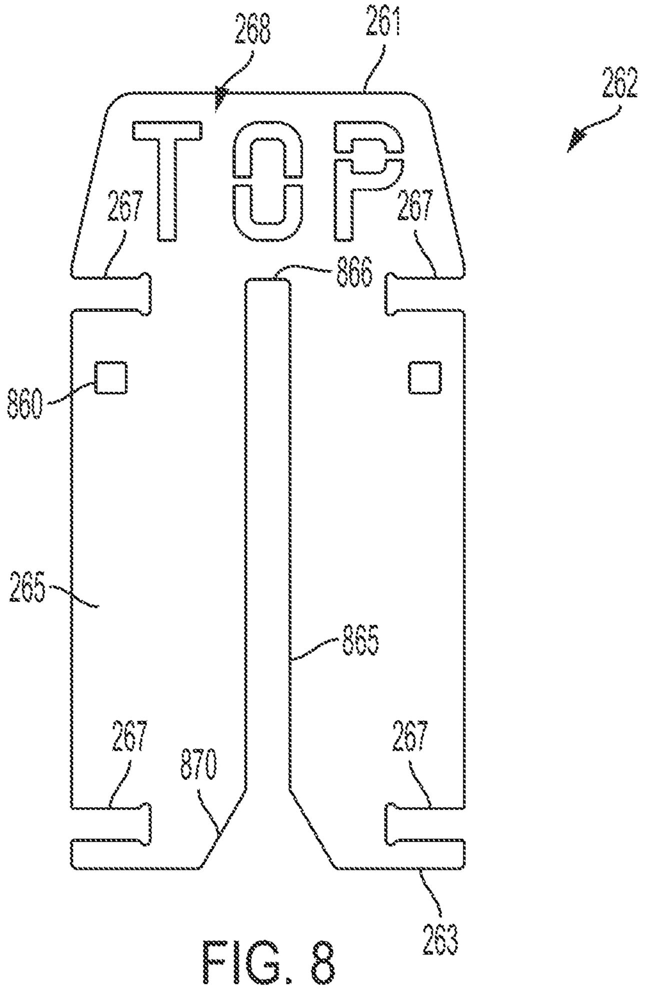
FIG. 8 is a front view of the attachment plate of the lock arm assembly of FIG. 2.

FIG. 8 is a front view of the attachment plate 262. The attachment plate 262 can define the mounting slot 865, as shown. In some aspects, a lower portion 870 of the mounting slot 865 can taper outwards (i.e., increase in width) towards the plate lower end 263. The increased width of the mounting slot 865 at the plate lower end 263 can facilitate guiding the guide ledge 246 (shown in FIG. 2) into engagement with the mounting slot 865.

Figure 9:
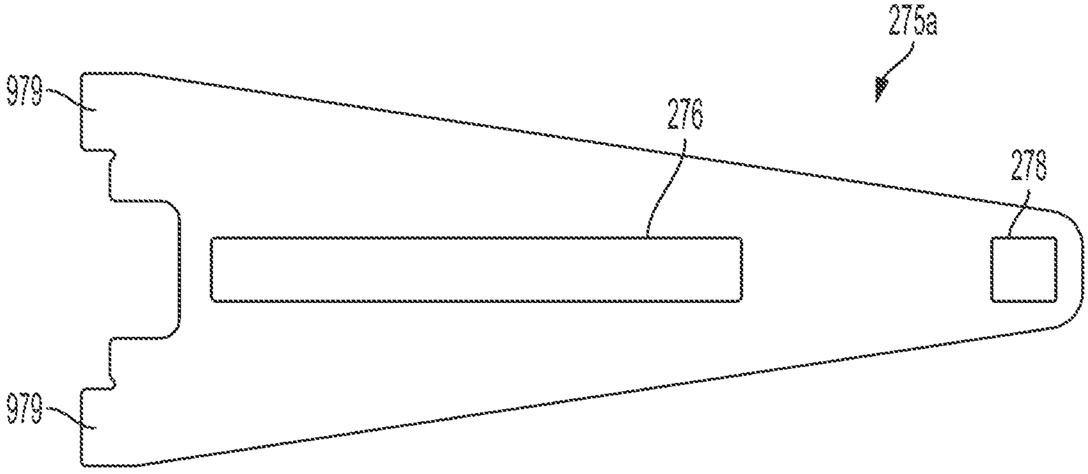
FIG. 9 is a top view of a support member of the lock arm assembly of FIG. 2.

FIG. 9 is a top view of the first support member 275*a*, which can also be representative of the second support member 275*b*.

Figure 10A:
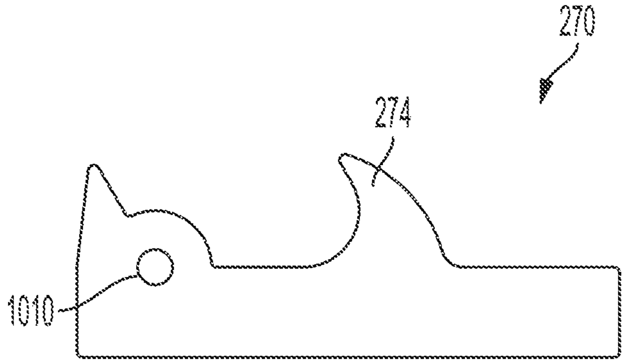
FIG. 10A is a front view of a lock element of the lock arm assembly of FIG. 2.

FIG. 10A is a front view of the lock element 270.

Figure 10B:
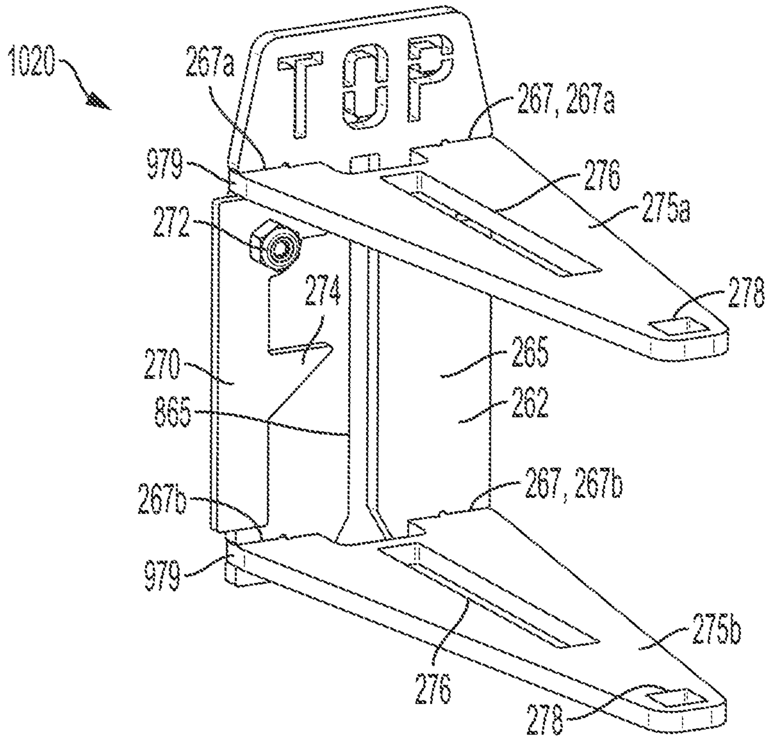
FIG. 10B is a front perspective view of an attachment bracket comprising the attachment plate of FIG. 8, the lock element of FIG. 10A, and a pair of the support members of FIG. 9.

FIG. 10B is a front perspective view of an attachment bracket 1020 comprising the attachment plate 262 assembled with the first and second support members 275*a,b* and the lock element 270. The attachment bracket 1020 can be coupled to the first and second arm members 280*a,b* (shown in FIG. 2) and can be configured to mount the lock arm assembly 260 to the front mounting assembly 230 of the door mount 210 (210, 260, and 230 shown in FIG. 2). The attachment plate 262 can define the mounting slot 865. Each of the first and second support members 275*a,b* can define the support adjustment slot 276 and the support fastener hole 278. To couple the first support member 275*a* to the attachment plate 262, each of the support tabs 979 of the first support member 275*a* can engage a corresponding first attachment slot 267*a* of the attachment slots 267 of the attachment plate 262. Similarly, to couple the second support member 275*b* to the attachment plate 262, each of the support tabs 979 of the second support member 275*b* can engage a corresponding second attachment slot 267*b* of the attachment slots 267. Furthermore, the lock element 270 can be secured to the attachment outer surface 265 of the attachment plate 262 by the lock fastener 272. Example aspects of the lock element 270 can define the lock projection 274, which can extend towards the mounting slot 865, as shown.

Figure 11:
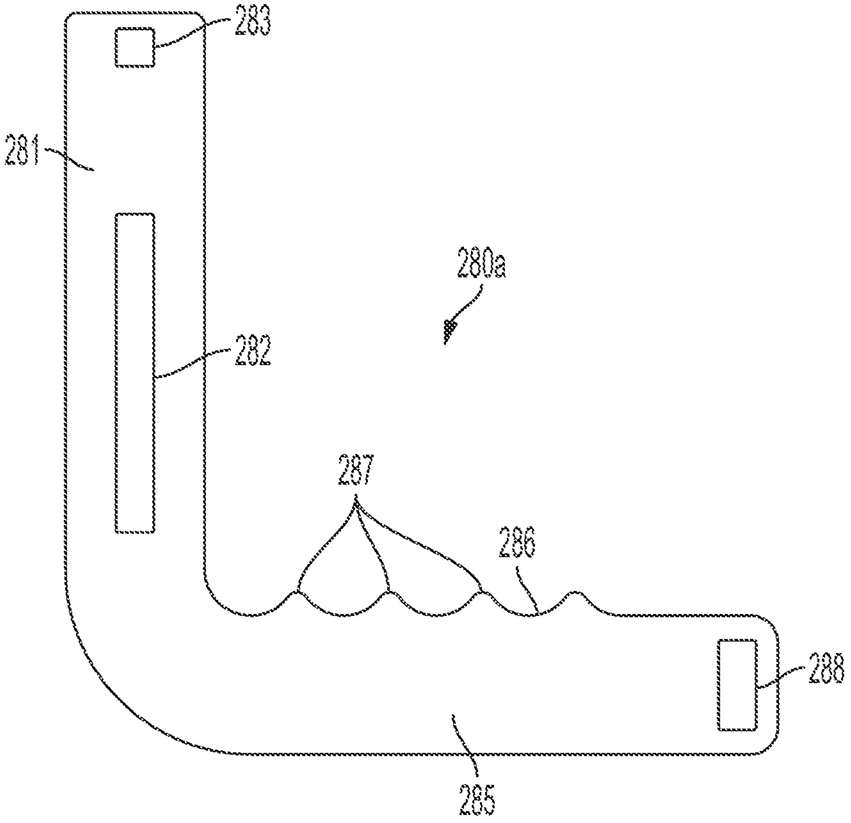
FIG. 11 is a top view of an arm member of the lock arm assembly of FIG. 2.

FIG. 11 is a top view of the first arm member 280*a*, which can also be representative of the second arm member 280*b*.

Figure 12A:
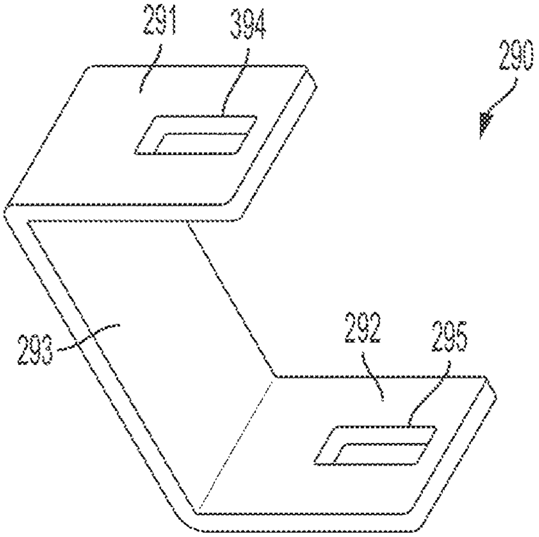
FIG. 12A is a perspective view of an engagement pad of the lock arm assembly of FIG. 2.

FIG. 12A is a perspective view of the engagement pad 290.

Figure 12B:
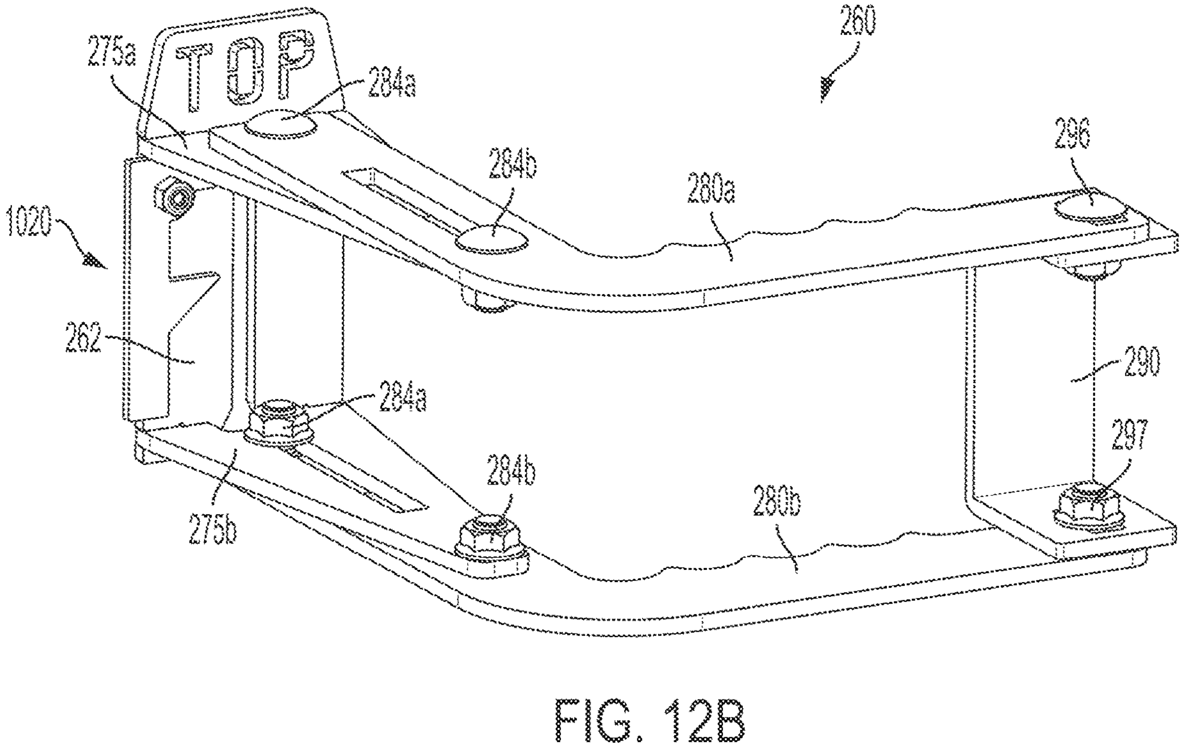
FIG. 12B is a perspective view of the lock arm assembly of FIG. 2.

FIG. 12B is a front perspective view of the lock arm assembly 260. The lock arm assembly 260 can comprise the attachment bracket 1020, the first and second arm members 280*a,b*, and the engagement pad 290. As described above, the first adjustment fasteners 284*a* and the second adjustment fasteners 284*b* can adjustably couple the first and second arm members 280*a,b* to the first and second support members 275*a,b*, respectively. The first and second arm members 280*a,b* can be adjustable towards and away from the attachment plate 262. Additionally, the first and second pad fasteners 296,297 can adjustable couple the engagement pad 290 to the first and second arm members 280*a,b*, respectively.

Figure 13:
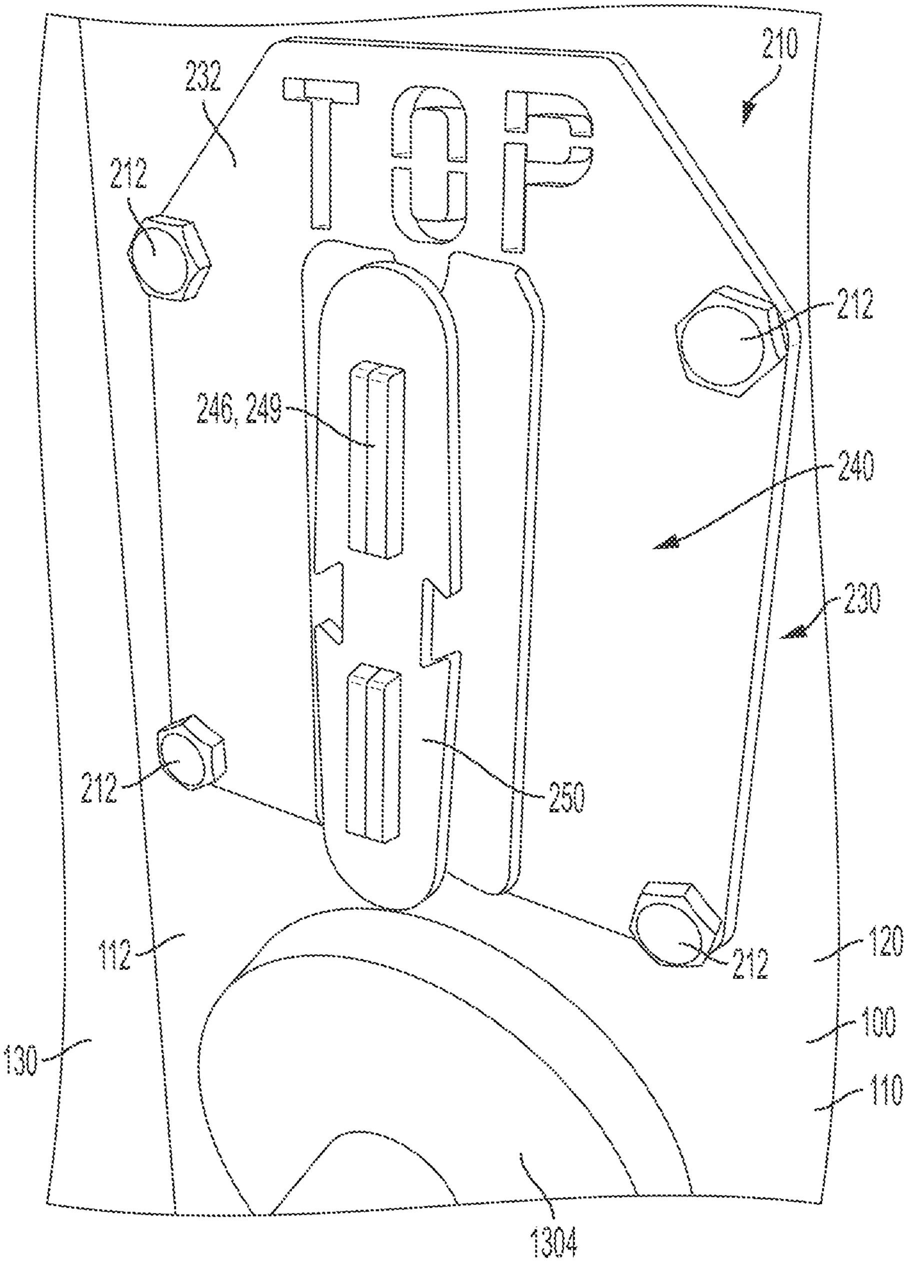
FIG. 13 is a front perspective view of the door mount of FIG. 2 mounted to a door, in accordance with another aspect of the present disclosure.

FIG. 13 illustrates the door mount 210 of the door lock device 200 (shown in FIG. 14) mounted to the door 100, in accordance with another aspect of the present disclosure. The front mounting assembly 230 can be coupled to the door panel 110 at the door panel front face 120, and the rear base plate 220 (shown in FIG. 2) can be coupled to the door panel 110 at the door panel rear face. The mounting fasteners 212 can extend through the door panel 110 and can engage the rear base plate 220 and the front base plate 232 to secure the door mount 210 to the door 100. The mounting guide 240 can be coupled to the front base plate 232, and the guide cap 250 can be coupled to the guide ledge 246 (such as the guide tabs 249) of the mounting guide 240. In the present aspect, the door mount 210 can be mounted directly above the door handle 1304 at or near the first door side 112 of the door 100 and adjacent to the door frame 130. FIG. 14 illustrates the lock arm assembly 260 of the door lock device 200 mounted on the door mount 210. As shown, the engagement pad 290 of the lock arm assembly 260 can engage the wall 140 surrounding the door frame 130 to prohibit the door 100 from being opened.

According to example aspects, various components of the door lock device 200 can be formed from a metal material, such as steel. For example, some or all of the rear base plate 220, the front base plate 232, the mounting guide 240, the guide cap 250, the attachment plate 262, the lock element 270, the first and second support members 275*a,b*, the first and second arm members 280*a,b*, and the engagement pad 290 can be formed from steel. In other aspects, some or all of the components of the door lock device 200 can be formed from any other suitable material known in the art, including but not limited to, other metal materials, plastics, composites, and the like.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A door lock device comprising:

a door mount comprising a front base plate and a mounting guide coupled to the front base plate, the door mount configured to mount to a door; and a lock arm assembly comprising an attachment plate and a structure engagement assembly, the attachment plate defining a mounting slot, the mounting guide engaging the mounting slot to mount the lock arm assembly on the door mount, the structure engagement assembly configured to engage a structure surrounding the door to prevent the door from opening;

wherein:

the structure engagement assembly comprises a substantially L-shaped arm member coupled to the attachment plate;

the lock arm assembly further comprises a support member coupling the arm member to the attachment plate;

the support member is oriented perpendicular to the attachment plate;

one of the support member and the arm member defines an adjustment slot;

the other of the support member and the arm member defines a fastener hole;

an adjustment fastener extends through each of the adjustment slot and the fastener hole to couple the arm member to the support member; and the adjustment fastener is slidable within the adjustment slot to reposition the arm member relative to the support member.

2. The door lock device of claim 1, wherein the mounting guide comprises a guide component coupled to the front base plate, the guide component comprising a guide tab portion extending outward and away from the front base plate, the guide tab portion at least partially defining a guide ledge of the door mount, the guide ledge oriented about perpendicular to the front base plate, the guide ledge engaging the mounting slot.

3. The door lock device of claim 2, wherein the guide tab portion is a first guide tab portion, the guide component further comprising a second guide tab portion spaced from the first guide tab portion.

4. The door lock device of claim 2, wherein the guide component further comprises an engagement tab portion extending inward and toward the front base plate, the front base plate defining an engagement opening, the engagement tab portion engaging the engagement opening to couple the guide component to the front base plate.

5. The door lock device of claim 4, wherein the guide component further comprises a guide body portion, the guide body portion abutting and oriented substantially parallel to the front base plate.

6. The door lock device of claim 5, wherein:

the guide component is a first guide component;

the mounting guide further comprises a second guide component substantially identical to the first guide component;

the guide tab portions of the first and second guide components together define a guide tab of the mounting guide;

the engagement tab portions of the first and second guide components together define an engagement tab of the mounting guide; and the guide body portions of the first and second guide components together define a guide body of the mounting guide.

7. The door lock device of claim 2, wherein the door mount further comprises a guide cap defining a cap opening, the guide tab engaging the cap opening to couple the guide cap to the guide component, a guide channel defined between the guide cap and the front base plate, the guide tab traversing the guide channel.

8. The door lock device of claim 2, wherein:

the front base plate is securable to a first door side of the door by a mounting fastener; and the door mount further comprises a rear base plate securable to a second door side of the door opposite the first door side by the mounting fastener.

9. The door lock device of claim 1, further comprising an engagement pad coupled to the arm member distal to the attachment plate, the engagement pad defining an engagement portion configured to engage the structure surrounding the door.

10. The door lock device of claim 9, wherein:

the arm member defines an arm slot;

the engagement pad defines a pad slot;

a pad fastener extends through each of the arm slot and the pad slot to couple the engagement pad to the arm member; and the pad fastener is slidable within at least one of the arm slot and the pad slot to reposition the engagement pad relative to the arm member.

11. The door lock device of claim 9, wherein:

the arm member is a first arm member;

the structure engagement assembly further comprises a substantially L-shaped second arm member oriented substantially parallel to the first arm member; and the engagement pad is coupled to and extends between the first arm member and the second arm member.

12. The door lock device of claim 1, wherein the support member comprises a support tab, the attachment plate defines an attachment slot, and the support tab engages the attachment slot to couple the support member to the attachment plate.

13. The door lock device of claim 1, wherein:

the arm member is a first arm member, and the support member is a first support member;

the structure engagement assembly further comprises a substantially L-shaped second arm member;

the lock arm assembly further comprises a second support member coupling the second arm member to the attachment plate; and the second support member is substantially parallel to the first support member.

14. A method of locking a door with a door lock device, the method comprising:

attaching a door mount to a door, the door mount comprising a mounting guide;

mounting a lock arm assembly to the door mount, comprising sliding a guide ledge of the door mount into a mounting slot of the lock arm assembly; and engaging a structure engagement assembly of the lock arm assembly with a structure surrounding the door to prevent the door from opening;

wherein:

the lock arm assembly comprises an attachment plate and a support member;

the structure engagement assembly comprises an arm member;

the support member couples the arm member to the attachment plate;

the support member is oriented perpendicular to the attachment plate;

one of the support member and the arm member defines an adjustment slot;

the other of the support member and the arm member defines a fastener hole;

an adjustment fastener extends through each of the adjustment slot and the fastener hole to couple the arm member to the support member; and the method further comprises sliding the adjustment fastener within the adjustment slot to reposition the arm member relative to the support member.

15. The method of claim 14, wherein the mounting slot is formed in the attachment plate of the lock arm assembly, and wherein sliding the guide ledge of the door mount into the mounting slot comprises aligning the mounting slot above the guide ledge and lowering the attachment plate onto the guide ledge.

16. The method of claim 15, further comprising engaging an upper ledge end of the guide ledge with an upper slot end of the mounting slot to support the lock arm assembly on the door mount.

17. The method of claim 14, wherein the structure engagement assembly comprises the arm member and an engagement pad coupled to the arm member, the engagement pad defining an engagement portion configured to engage the structure surrounding the door.

18. The method of claim 17, wherein:

the arm member defines an arm slot;

the engagement pad defines a pad slot;

a pad fastener extends through each of the arm slot and the pad slot to couple the engagement pad to the arm member; and the method further comprises sliding the pad fastener within at least one of the arm slot and the pad slot to reposition the engagement pad relative to the arm member.

19. A door lock device comprising:

a door mount comprising a front base plate and a mounting guide coupled to the front base plate, the door mount configured to mount to a door; and a lock arm assembly comprising an attachment plate and a structure engagement assembly, the attachment plate defining a mounting slot, the mounting guide engaging the mounting slot to mount the lock arm assembly on the door mount, the structure engagement assembly configured to engage a structure surrounding the door to prevent the door from opening;

wherein:

the mounting guide comprises a guide component coupled to the front base plate, the guide component comprising a guide tab portion extending outward and away from the front base plate, the guide tab portion at least partially defining a guide ledge of the door mount, the guide ledge oriented about perpendicular to the front base plate, the guide ledge engaging the mounting slot;

the guide component further comprises an engagement tab portion extending inward and toward the front base plate, the front base plate defining an engagement opening, the engagement tab portion engaging the engagement opening to couple the guide component to the front base plate;

the guide component further comprises a guide body portion, the guide body portion abutting and oriented substantially parallel to the front base plate;

the guide component is a first guide component;

the mounting guide further comprises a second guide component substantially identical to the first guide component;

the guide tab portions of the first and second guide components together define a guide tab of the mounting guide;

the engagement tab portions of the first and second guide components together define an engagement tab of the mounting guide; and the guide body portions of the first and second guide components together define a guide body of the mounting guide.

20. A door lock device comprising:

a door mount comprising a front base plate and a mounting guide coupled to the front base plate, the door mount configured to mount to a door; and a lock arm assembly comprising an attachment plate and a structure engagement assembly, the attachment plate defining a mounting slot, the mounting guide engaging the mounting slot to mount the lock arm assembly on the door mount, the structure engagement assembly configured to engage a structure surrounding the door to prevent the door from opening;

wherein:

the mounting guide comprises a guide component coupled to the front base plate, the guide component comprising a guide tab portion extending outward and away from the front base plate, the guide tab portion at least partially defining a guide ledge of the door mount, the guide ledge oriented about perpendicular to the front base plate, the guide ledge engaging the mounting slot; and the door mount further comprises a guide cap defining a cap opening, the guide tab engaging the cap opening to couple the guide cap to the guide component, a guide channel defined between the guide cap and the front base plate, the guide tab traversing the guide channel.

21. A door lock device comprising:

a door mount comprising a front base plate and a mounting guide coupled to the front base plate, the door mount configured to mount to a door; and a lock arm assembly comprising an attachment plate and a structure engagement assembly, the attachment plate defining a mounting slot, the mounting guide engaging the mounting slot to mount the lock arm assembly on the door mount, the structure engagement assembly configured to engage a structure surrounding the door to prevent the door from opening;

wherein:

the structure engagement assembly comprises a substantially L-shaped arm member coupled to the attachment plate;

the door lock device further comprises an engagement pad coupled to the arm member distal to the attachment plate;

the engagement pad defines an engagement portion configured to engage the structure surrounding the door;

the arm member is a first arm member;

the structure engagement assembly further comprises a substantially L-shaped second arm member oriented substantially parallel to the first arm member; and the engagement pad is coupled to and extends between the first arm member and the second arm member.

22. A door lock device comprising:

a door mount comprising a front base plate and a mounting guide coupled to the front base plate, the door mount configured to mount to a door; and a lock arm assembly comprising an attachment plate and a structure engagement assembly, the attachment plate defining a mounting slot, the mounting guide engaging the mounting slot to mount the lock arm assembly on the door mount, the structure engagement assembly configured to engage a structure surrounding the door to prevent the door from opening;

wherein:

the structure engagement assembly comprises a substantially L-shaped arm member coupled to the attachment plate;

the lock arm assembly further comprises a support member coupling the arm member to the attachment plate;

the support member is oriented perpendicular to the attachment plate;

the arm member is a first arm member, and the support member is a first support member;

the structure engagement assembly further comprises a substantially L-shaped second arm member;

the lock arm assembly further comprises a second support member coupling the second arm member to the attachment plate; and the second support member is substantially parallel to the first support member.

* * * * *